June 28, 1955     L. H. GARDNER     2,711,757
VALVE
Filed April 18, 1951
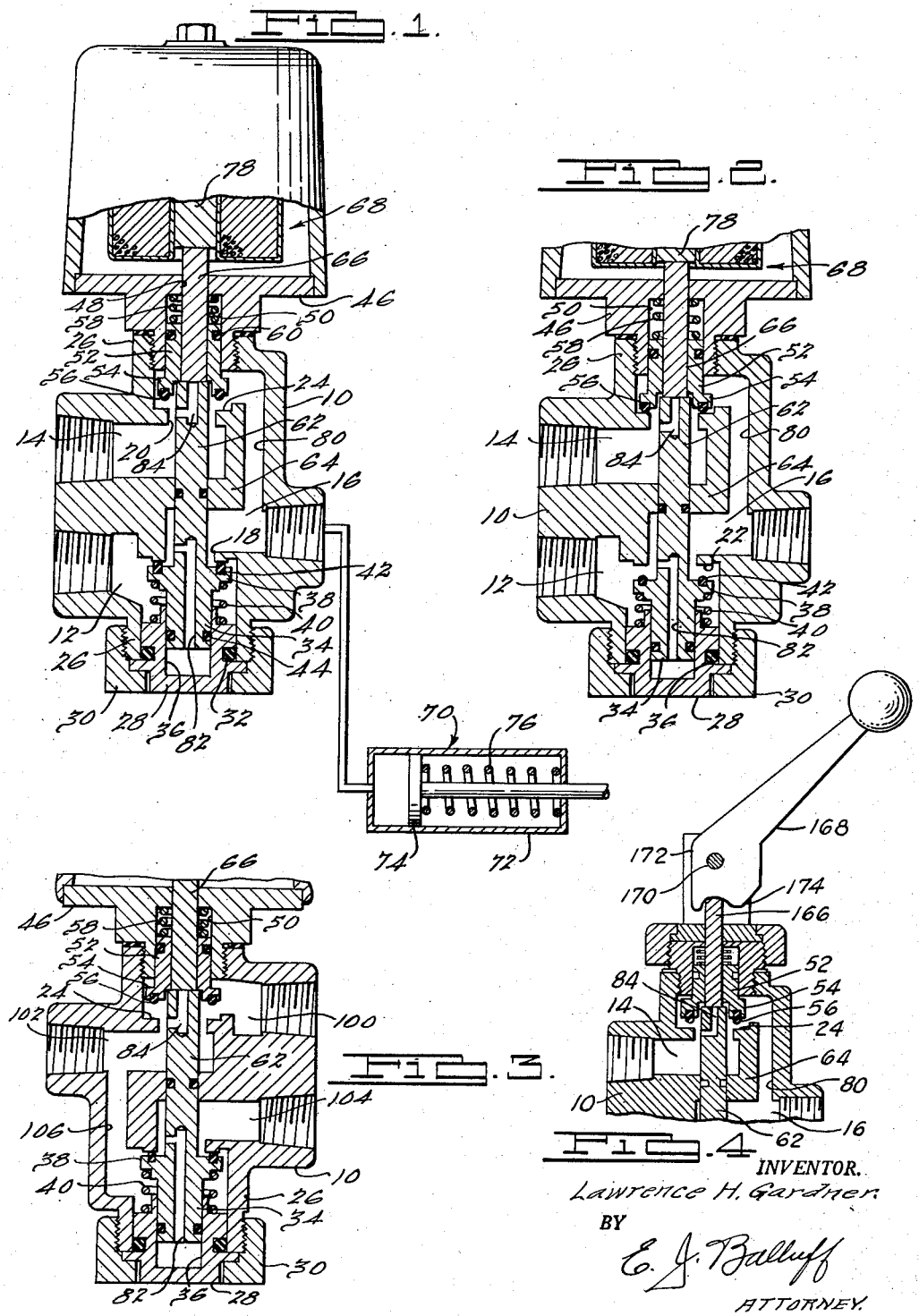
INVENTOR.
Lawrence H. Gardner
BY
E. J. Balluff
ATTORNEY.

2,711,757

Patented June 28, 1955

United States Patent Office 2,711,757

VALVE

Lawrence H. Gardner, North Olmsted, Ohio

Application April 18, 1951, Serial No. 221,669

8 Claims. (Cl. 137—620)

This invention relates to valve structure in general and has particular reference to a valve for controlling the flow of fluid from a source of fluid under pressure to a pressure actuated device or to any other device to which pressure fluid is to be supplied for performing work.

A principal object of the invention is to provide a new and improved flow control valve.

Another object of the invention is to provide an improved solenoid valve for controlling the flow of fluid to and from a pressure actuated device.

A further object of the invention is to provide a novel means for controlling the operation of a flow control valve.

Other and further objects of the invention will be apparent from the following description and claims and may be understood by reference to the accompanying drawings, of which there is one sheet, which by way of illustration show preferred embodiments of the invention and what I now consider to be the best mode in which I have contemplated applying the principles of my invention. Other embodiments of the invention may be used without departing from the scope of the present invention as set forth in the appended claims.

In the drawings:

Fig. 1 is a vertical sectional view through a valve embodying my invention;

Fig. 2 is a fragmentary sectional view similar to Fig. 1 but showing the valve in a different operative position thereof;

Fig. 3 is a fragmentary vertical sectional view through a modified form of the valve shown in Fig. 1;

Fig. 4 is a fragmentary view of the valve shown in Fig. 1 showing a modified form of control means for operating the valve.

In Fig. 1 there is disclosed a valve which comprises a valve body 10 being formed interiorly thereof to provide an inlet chamber 12, an exhaust chamber 14, and an intermediate work chamber 16. Each of the chambers is provided with a threaded opening and the chambers are adapted to be connected by means of the threaded openings respectively to a source of fluid under pressure, to atmosphere, and to a pressure actuated device.

The valve body 10 is provided with passages for connecting the inlet chamber 12 and the work chamber 16 in fluid flow relation and for connecting the work chamber 16 and the exhaust chamber 14 in fluid flow relation. Such passages include an inlet valve port or orifice 18 between the chambers 12 and 16 and an exhaust port or orifice 20 between the chambers 16 and 14. The valve ports 18 and 20 are axially aligned and an annular valve seat 22 surrounds the inlet port 18 and an annular valve seat 24 surrounds the exhaust port 20.

The valve body 10 is provided with a hollow neck portion 26 at each end thereof which communicates with the adjacent one of the chambers. A sleeve 28 is arranged within the neck 26 at the lower end of the valve and is secured therein by a nut 30 having a threaded engagement with the neck 26. The sleeve 28 has an annular groove in the periphery thereof and an O-ring 32 of soft, resilient material is arranged in the groove and provides a seal between the sleeve 28 and the valve body 10.

An elongated valve member 34 is slidably arranged within a central bore or passage 36 in the sleeve 28, the passage 36 communicating with the inlet chamber 12. The valve member 34 is provided with an enlarged collar 38 and a spring 40 confined between the collar 38 and the sleeve 28 biases the valve member 34 toward the valve seat 22. An O-ring 42 of soft, resilient material is secured within a groove provided in the upwardly facing surface of the shoulder 38, and the O-ring 42 is adapted to seat in sealing relation on the valve seat 22 for preventing the flow of fluid from the inlet chamber 12 to the work chamber 16 when the valve 34 is in its closed position. An O-ring 44 is arranged in a groove at the lower end of the valve 34 and provides a sliding seal between the valve 34 and the opening 36 in which the valve is slidably disposed.

The other end of the valve body 10 is provided with an internal threaded opening defining the neck 26 and a cap 46 is threadedly secured to the valve body 10. The cap 46 has a central opening 48 extending therethrough, the opening 48 being enlarged at the lower end thereof to provide a chamber 50 in which a second valve member 52 is slidably arranged for movement toward and away from the valve seat 24. The valve 52 is provided with an enlarged shoulder 54 having an O-ring 56 arranged in a groove provided in the downwardly presented face thereof. The O-ring 56 is adapted to seat in sealing relation on the valve seat 24 for preventing the flow of fluid from the work chamber 16 to the exhaust chamber 14 in the closed position of the valve 52. A spring 58 arranged in the chamber 50 biases the valve member 52 downwardly toward the valve seat 24, and an O-ring 60 secured in a groove in the valve 52 provides a sliding seal between the valve 52 and the cap 46.

The valve member 34 has an elongated stem portion 62 extending through the orifice 18 and a wall 64 of the valve body 10. The upper end of the elongated stem 62 projects through the valve port 20 and is engageable with the downwardly presented face of the valve member 52 for maintaining the valve member 52 off its valve seat when the valve 34 is seated. When the valve 34 is opened, as shown in Fig. 2, the valve 52 is moved downwardly into engagement with the valve seat 24 for closing the valve port 20.

A valve actuating member 66 extends through the opening 48 in the cap 46 and is engageable with the upper end of the elongated stem portion 62 of the valve 34. The actuating member 66 extends through and is slidably arranged relative to the valve member 52. A solenoid 68 is mounted on the cap 46 and during energization thereof is arranged to move the valve actuating member 66 downwardly for moving the valve member 34 away from its seat so as to establish communication between the inlet chamber 12 and the work chamber 16.

The valve shown in Fig. 1 is normally closed and is adapted to supply fluid to a pressure actuated device 70 whenever the solenoid 68 is energized. The pressure actuated device 70, as illustrated in Fig. 1, comprises a cylinder 72 having a piston 74 arranged therein and biased toward one end of the cylinder by a spring 76. Fluid under pressure from the work chamber 16 is supplied to one end of the cylinder 72 and such pressure fluid is adapted to move the piston 74 against the force exerted by the spring 76. The piston 74 is connected to the particular mechanism or device the operation of which is to be controlled by the valve. It is apparent that the pressure actuated device 70 illustrated is for purposes of illustration only and that the valve might be used in any other suitable installation in which fluid pressure is to be supplied for doing work.

In the position of the valves 34 and 52 as shown in Fig. 1, fluid under pressure in the inlet chamber 12 acts upon the downwardly presented surfaces of the shoulder 38 to maintain the valve 34 on its valve seat and the spring 40 also helps to maintain the valve 34 on its seat. The valve 52 is at such time maintained off its valve seat 24 by the engagement therewith by the elongated stem 62 of the valve 34. With the valve 34 seated as shown in Fig. 1, the work chamber 16 is sealed off from the inlet chamber 12. When the solenoid 68 is energized the solenoid core 78 moves downwardly and operates the valve actuating member 66 so as to cause the same to move the valve member 34 downwardly for opening the valve port 18 and permitting the flow of fluid from the chamber 12 to the chamber 16 and through the port associated therewith into the cylinder 72, thereby moving the piston 74. The valve member 52 upon the movement of the valve 34 away from its seat 22 is moved downwardly into engagement with the valve seat 24 under the influence of the spring 58. When the valve 52 is seated, the communication between the work chamber 16 and the exhaust chamber 14 is closed. When the solenoid is deenergized the valve member 34 will move upwardly and will again be seated on its valve seat 22 under the influence of the spring 40 and will be maintained on its seat by the fluid pressure acting upon the shoulder 38. The fluid previously supplied to the cylinder 72 for doing work is then discharged back into the work chamber 16 and is discharged to atmosphere or to some other suitable exhaust through the passage 80 and the exhaust port 20, which is now open, into the exhaust chamber 14. It will thus be seen that the fluid within the cylinder 72 will be ported to atmosphere as soon as the valve member 52 moves away from its seat 24.

The valve member 34 is provided with an internal passage 82 communicating at its lower end with the interior of the sleeve 28 and at the other end thereof with the work chamber 16 so that the pressure within the chamber 36 in the sleeve 28 will always be equal to the pressure existing in the work chamber 16. The equalizing of the pressures acting on the valve 34 on opposite sides of the sliding seal 44 therefore permits the valve 34 to slide freely within the sleeve 28 in either direction and prevents any dashpot action which would otherwise exist within the chamber 36. As shown in Fig. 2, when the valve 34 is in its open position the fluid under pressure will be transmitted through the passage 82 to the interior of the sleeve, and such pressure will act on the lower end of the valve 34 to aid in closing the same when the solenoid is deenergized as previously described.

The sliding fit between the valve actuating member 66 and the valve 52 is such as to permit fluid to bleed through the passage in valve 52 into and out of chamber 50. The pressure within the chamber 50 is therefore equal to the pressure existing in the exhaust chamber 14 so that the valve 52 is freely slidable within the chamber 50 during opening or closing movement of the valve 52. Passage 84 in the upper end of valve stem 62 transmits the fluid pressure existing in chamber 14 against the lower end of the actuating member 66.

When the valve 34 is open the pressure fluid being supplied to the pressure actuated device 70 is also transmitted through the passage 80 and exerts a downward force on the shoulder 54 of the valve 52 to maintain the same on its seat. As soon as the solenoid is deenergized the valve 34 will start to move upwardly under the influence of the spring 40 and will engage the valve 52 for moving the same away from its seat. As soon as the valve 52 is moved off its valve seat the pressure fluid will act on the downwardly presented faces of the shoulder 54 thereof to aid in moving the valve 52 against the force of the spring 58 since the area of the downwardly presented faces of the valve 52 against which the pressure fluid acts is greater than the area of the upwardly presented faces thereof against which fluid pressure acts. Similarly, fluid pressure will aid in moving the valve 34 toward its seat when the solenoid is deenergized because the area of the downwardly facing surfaces of the valve 34 against which fluid pressure acts to seat the valve is greater than the area of the upwardly facing surface against which fluid pressure acts tending to unseat the valve. Thus, each of the valves 52 and 34 will be moved rapidly either toward or away from their respective valve seats by the forces exerted by the fluid pressure against the valves 52 and 34 and under the influence of the springs 58 and 40. Fluid pressure from chamber 12 acts to maintain valve 34 on its seat when valve 34 is closed, and fluid pressure also holds valve 52 against its seat when such valve is seated.

In Fig. 3 there is disclosed a modification of the valve shown in Fig. 1. The valve shown in Fig. 3 is normally open, while that shown in Figs. 1 and 2 is normally closed. The structure and parts of the valve shown in Fig. 3 are essentially the same as the corresponding parts shown in the valve of Fig. 1, and therefore the reference characters employed in the description of Fig. 1 will be applied to the corresponding parts shown in Fig. 3. In this modification the chamber 100 is the inlet chamber, the chamber 102 is the work chamber, and 104 is the exhaust chamber. The valve member 52 therefore becomes the inlet valve and the valve member 34 the outlet valve.

In the modification shown in Fig. 3 the valve 52 is maintained in its open position by the fluid under pressure in the inlet chamber 100 which acts against the downwardly presented surfaces of the valve 52, and by virtue of the engagement of the valve 52 by the valve 34. The pressure fluid in the normally open position of the valve 52 is transmitted through the passage 106 and acts against the downwardly facing surfaces of the shoulder 38 of the valve 34 for maintaining the valve 34 in its closed position, aided by the spring 40. When the solenoid is energized the valve 34 will be moved away from its seat and the valve 52 will then be free to move downwardly toward its seat 24 for shutting off the flow of fluid from the inlet chamber 100 to the work chamber 102. The normally open valve shown in Fig. 3 operates similarly to the normally closed valve shown in Fig. 1, and the valves 52 and 34 respond to fluid pressure and the springs 58 and 40 in essentially the same manner as stated in the description of Fig. 1, to operate the normally open valve.

In Fig. 4 there is disclosed a portion of a valve similar to that shown in Fig. 1 except that the valve of Fig. 4 may be hand operated, rather than operated by a solenoid. In this modification the valve actuating member 166 is provided with a rounded upper end, and a hand lever 168 pivoted about a pin 170 secured to a bracket 172 is engageable with the upper end of the valve actuating member 166. The lower end of the lever 168 is provided with cam surfaces 174 so that when the lever 168 is pivoted in a clockwise direction the cam surface 174 will engage the actuating member 166 and move the same downwardly for moving the valve member 34 as previously described.

While I have illustrated and described preferred embodiments of my invention, it is understood that these are capable of modification and I therefore do not wish to be limited to the precise details set forth but desire to avail myself of such changes and alterations as fall within the purview of the following claims.

I claim:

1. Valve structure comprising a valve body formed to provide an inlet chamber, an exhaust chamber, and a work chamber therebetween, said chambers being adapted to be connected respectively to a source of fluid under pressure, to atmosphere, and to a pressure actuated device, said valve body having a passage therein connecting said inlet and work chambers in fluid flow relation and a passage connecting said work and exhaust chambers in fluid flow relation, each of said passages including a valve port, a valve seat surrounding each of said valve ports, said valve seats facing in opposite directions, a sleeve arranged in said valve body at one end thereof opposite one of said valve seats, a first valve member slidably arranged in said sleeve for movement toward and away from said one valve seat and having a part thereof adapted to seat in sealing relation on said one valve seat for closing the adjacent valve port, means for urging said valve member into engagement with its valve seat, a valve operating member slidably arranged in said body for movement relative to said valve member and engageable therewith, means for actuating said valve operating member for moving said valve member away from its seat for opening said adjacent valve port, a second valve member slidably arranged in said valve body for movement relative to said first valve member and for movement toward and away from the other of said valve seats for opening and closing the other of said valve ports, spring means for resiliently urging said second valve member toward its seat, said first valve member having a part thereof engageable with said second valve member for maintaining said second valve member off its valve seat when said first valve member is seated, and means providing a sliding seal between said first valve member and said sleeve, said first valve member having a passage formed interiorly thereof communicating at one end with the interior of said sleeve and at the other end with the interior of said valve body.

2. Valve structure comprising a valve body formed to provide an inlet chamber, an exhaust chamber, and a work chamber therebetween, said valve body having a passage therein connecting said inlet and work chambers in fluid flow relation and a passage connecting said work and exhaust chambers in fluid flow relation, each of said passages including a valve port, said valve ports being axially aligned, a valve seat surrounding each of said valve ports, said valve seats facing in opposite directions, a first valve member slidably arranged in said valve body for movement toward and away from one of said valve seats and having a part thereof adapted to seat in sealing relation on said one valve seat for closing the adjacent valve port, spring means for resiliently urging said first valve member into engagement with its valve seat, said first valve member having one end thereof extending through said adjacent valve port, a valve operating member slidably arranged in said body for movement relative to said first valve member and engageable with said end thereof, means for actuating said valve operating member for moving said first valve member away from its seat for opening said adjacent valve port, a second valve member slidably arranged in said valve body for movement relative to said first valve member and slidably disposed about said valve operating member for movement toward and away from the other of said valve seats for opening and closing the other of said valve ports, spring means for resiliently urging said second valve member toward its seat, said end of said first valve member being engageable with said second valve member for maintaining said second valve member off its seat when said first valve member is seated, said second valve member being movable toward its valve seat independently of movement of said first valve member away from its seat.

3. Valve structure comprising a valve body formed to provide an inlet chamber, an exhaust chamber, and a work chamber therebetween, said chambers being adapted to be connected respectively to a source of fluid under pressure, to atmosphere, and to a pressure actuated device, said valve body having a passage therein connecting said work chamber to said inlet chamber and a passage connecting said work chamber to said exhaust chamber, each of said passages including a valve orifice, a valve seat surrounding each of said valve orifices, a valve member for each of said valve orifices, each of said valve members being slidably arranged in said valve body for movement toward and away from its adjacent valve seat and adapted to seat thereon in sealing relation for closing the adjacent orifice, said valve members being relatively movable but engageable with each other and constructed and arranged so that when one of said valve members is seated on its valve seat the other of said valve members is maintained in an unseated position relative to its valve seat by the engagement therewith by said one valve member, a valve operating member slidably arranged in said valve body and engageable with said one valve member, and means for actuating said valve operating member so that the same will move said one valve member away from its seat for opening the orifice associated therewith, said movement of said one valve member away from its seat permitting said other of said valve members to seat on its valve seat for closing the orifice associated therewith, each of said valve members having surfaces exposed to the fluid pressures in said chambers, said surfaces being disposed so that, regardless of which valve is seated, the fluid pressures reacting on said surfaces tending to maintain the seated valve on its seat, are greater than the fluid pressures reacting on said surfaces tending to unseat the seated valve.

4. Valve structure comprising a valve body formed to provide an inlet chamber, an exhaust chamber, and a work chamber therebetween, said chambers being adapted to be connected respectively to a source of fluid under pressure, to atmosphere, and to a pressure actuated device, said valve body having a passage therein connecting said work chamber to said inlet chamber and a passage connecting said work chamber to said exhaust chamber, each of said passages including a valve orifice, a valve seat surrounding each of said valve orifices, a valve member for each of said valve orifices, each of said valve members being slidably arranged in said valve body for movement toward and away from its adjacent valve seat and adapted to seat thereon in sealing relation for closing the adjacent orifice, said valve members being relatively movable but engageable with each other and constructed and arranged so that when one of said valve members is seated on its valve seat the other of said valve members is maintained in an unseated position relative to its valve seat by the engagement therewith by said one valve member, spring means engageable with said one valve member for resiliently urging the same into engagement with its valve seat, a valve operating member slidably arranged in said valve body and engageable with said one valve member, and means for actuating said valve operating member so that the same will move said one valve member away from its seat for opening the orifice associated therewith, said movement of said one valve member away from its seat permitting said other of said valve members to seat on its valve seat for closing the orifice associated therewith, each of said valve members having surfaces exposed to the fluid pressures in said chambers, said surfaces being disposed so that, regardless of which valve is seated, the fluid pressures reacting on said surfaces tending to maintain the seated valve on its seat, are greater than the fluid pressures reacting on said surfaces tending to unseat the seated valve.

5. Valve structure according to claim 4 including a spring engageable with said other of said valve members for biasing the same into engagement with its seat when said one valve member is unseated by said valve actuating member.

6. Valve structure comprising a valve body formed to provide an inlet chamber, an exhaust chamber, and a work chamber therebetween, said chambers being adapted to be connected respectively to a source of fluid under pressure, to atmosphere, and to a pressure actuated device, said valve body having a passage therein connecting said work chamber to said inlet chamber and a passage connecting said work chamber to said exhaust chamber, said passages including axially aligned valve orifices, a valve seat surrounding each of said valve orifices, said valve seats facing in opposite directions, a valve member for each of said valve orifices, each of said valve members being slidably arranged in said valve body for movement toward and away from its adjacent valve seat and adapted to seat thereon in sealing relation for closing the adjacent orifice, said valve members being relatively movable, one of said valve members having an elongated stem extending through at least one of said orifices and into engagement with the other of said valve members and being constructed and arranged so that when said one of said valve members is seated said other of said valve members is maintained in an unseated position relative to its valve seat by the engagement therewith by said stem of said one valve member, spring means for biasing said one valve member toward its seat, each of said valve members having surfaces exposed to the fluid pressures in said chambers, said surfaces being disposed so that, regardless of which valve is seated, the fluid pressures reacting on said surfaces tending to maintain the seated valve on its seat, are greater than the fluid pressures reacting on said surfaces tending to unseat the seated valve, a valve operating member slidably arranged in said valve body and engageable with said stem of said one valve member, and means to actuate said valve operating member so that the same will move said one valve member away from its seat for opening the orifice associated therewith, said movement of said one valve member away from its seat permitting said other of said valve members to seat on its valve seat for closing the orifice associated therewith.

7. Valve structure according to claim 6 wherein said valve operating member extends through and is slidably arranged relative to said other valve member.

8. Valve structure comprising a valve body formed to provide an inlet chamber, an exhaust chamber, and a work chamber therebetween, said chambers being adapted to be connected respectively to a source of fluid under pressure, to atmosphere, and to a pressure actuated device, said valve body having a passage therein connecting said work chamber to said inlet chamber and a passage connecting said work chamber to said exhaust chamber, each of said passages including a valve orifice, a valve seat surrounding each of said valve orifices, a valve member for each of said valve orifices, each of said valve members being slidably arranged in said valve body for movement toward and away from its adjacent valve seat and adapted to seat thereon in sealing relation for closing the adjacent orifice, said valve members being relatively movable but engageable with each other and constructed and arranged so that when one of said valve members is seated the other of said valve members is maintained in an unseated position relative to its valve seat, a valve operating member slidably arranged in said valve body and engageable with said one valve member, and means for actuating said valve operating member so that the same will move said one valve member away from its seat for opening the orifice associated therewith, said movement of said one valve member away from its seat permitting said other of said valve members to seat on its valve seat for closing the orifice associated therewith, said valve members having surfaces against which the fluid pressures in said chambers react so as to maintain said valve members in an unbalanced condition regardless of which of said valve members is seated, said surfaces being arranged so that said fluid pressures react on said valve members to tend to maintain the seated one of said valve members on its valve seat.

References Cited in the file of this patent
UNITED STATES PATENTS

| Number | Name | Date |
|---|---|---|
| 820,917 | Culler | May 15, 1906 |
| 1,515,353 | Martin | Nov. 11, 1924 |
| 2,086,265 | Hanney | July 6, 1937 |
| 2,204,808 | McNeal | June 18, 1940 |
| 2,218,861 | Stumpf | Oct. 22, 1940 |
| 2,354,960 | Morehouse | Aug. 1, 1944 |
| 2,404,514 | McClure | July 23, 1946 |
| 2,543,010 | Gardner | Feb. 27, 1951 |
| 2,562,392 | Ray | July 31, 1951 |